(12) United States Patent
Ichimura

(10) Patent No.: US 7,295,393 B2
(45) Date of Patent: Nov. 13, 2007

(54) DATA CONVERTING APPARATUS, DATA CONVERTING METHOD, AND RECORDING MEDIUM

(75) Inventor: Gen Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 932 days.

(21) Appl. No.: 10/647,240

(22) Filed: Aug. 26, 2003

(65) Prior Publication Data

US 2004/0098252 A1 May 20, 2004

(30) Foreign Application Priority Data

Sep. 10, 2002 (JP) ............................. 2002-263747

(51) Int. Cl.
*G11B 15/04* (2006.01)
*H04N 5/91* (2006.01)
*H04J 3/16* (2006.01)

(52) U.S. Cl. ........................... 360/60; 370/466; 386/94

(58) Field of Classification Search .................. 360/60; 386/94; 369/58, 54; 380/4; 709/224; 370/465, 370/466, 467, 419
See application file for complete search history.

(56) References Cited

U.S. PATENT DOCUMENTS 6,034,832 A * 3/2000 Ichimura et al. .............. 360/60

FOREIGN PATENT DOCUMENTS

| EP | 0 959 467 | 11/1999 |
|----|-----------|---------|
| EP | 1 017 049 | 7/2000 |
| EP | 1 202 271 | 5/2002 |

* cited by examiner

*Primary Examiner*—Hanh Nguyen
(74) *Attorney, Agent, or Firm*—Oblon, Spivak, McClelland, Maier & Neustadt, P.C.

(57) ABSTRACT

A data converting apparatus is disclosed which receives packet data made of content data supplemented with recording control information to be referenced upon recording of the content data. When the data converting apparatus outputs the received packet data to another apparatus, the converting apparatus converts the recording control information to a specific value if the other apparatus is expected to function normally only by use of that specific value replacing the recording control information.

18 Claims, 9 Drawing Sheets

FIG. 4

| CCI BIT | COPY CONTROL OPERATIONS |
|---|---|
| TYPE 1 | COPY FREELY |
| TYPE 2 | COPY ONE GENERATION |
| TYPE 3 | COPY NEVER |
| TYPE 4 | NO COPY FOR FIXED PERIOD |
| TYPE 5 | COPY FIXED TIMES |
| TYPE 6 | COPY BY LICENSING |

FIG. 5

| TRACK ID | COPY REQUEST COUNT |
|----------|--------------------|
| ID1      | 2                  |
| ID2      | 3                  |
| ID3      | 1                  |
| ⋮        | ⋮                  |

F I G. 7
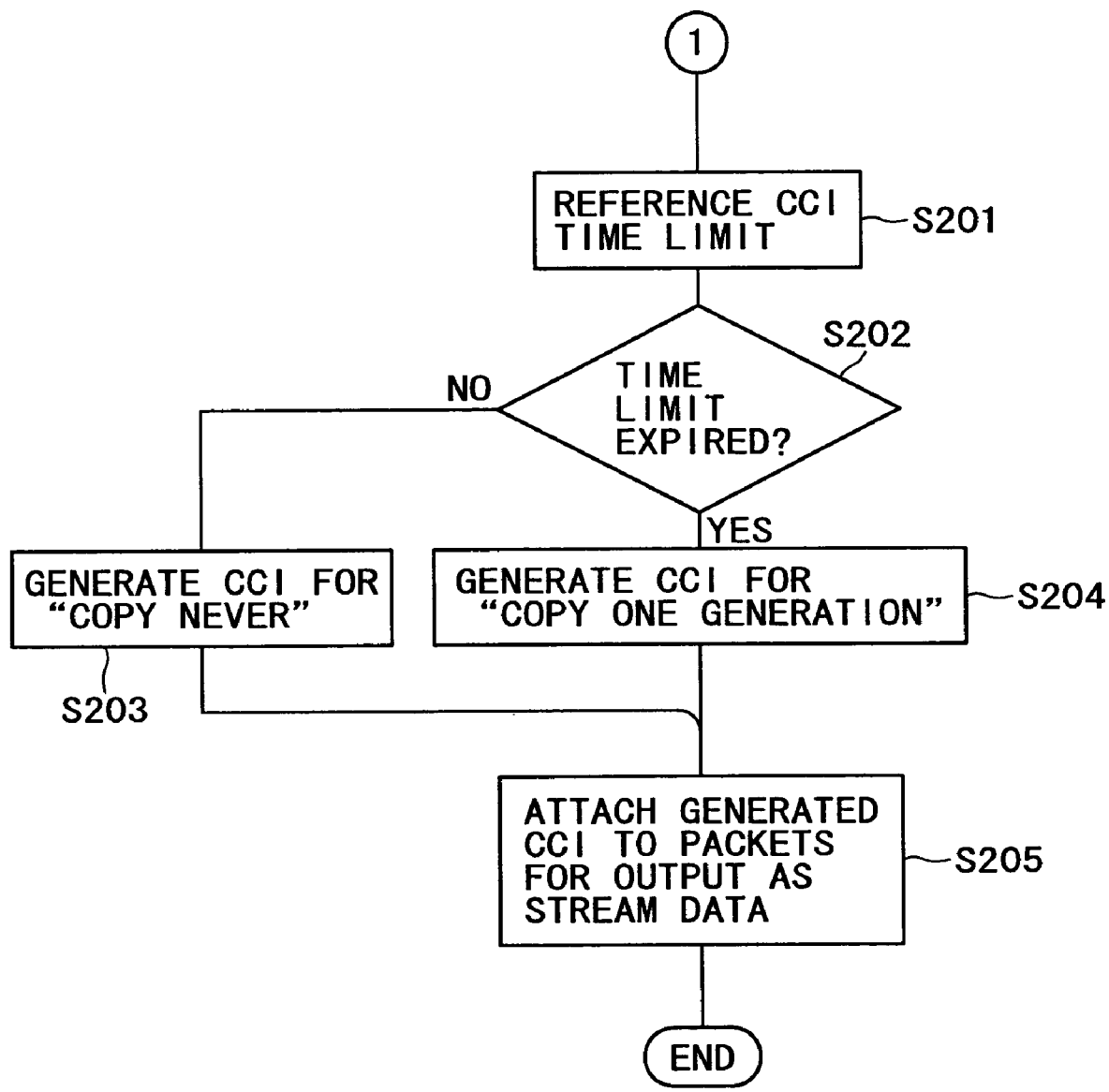

DATA CONVERTING APPARATUS, DATA CONVERTING METHOD, AND RECORDING MEDIUM

BACKGROUND OF THE INVENTION

The present invention relates to a data converting apparatus, a data converting method, and a recoding medium for implementing data conversion when packet data which are made of content data supplemented with recording control information to be referenced upon recording of the content data and which are input to a first apparatus are output from there to a second apparatus.

With rapid advances in digital technology in recent years, it has become commonplace to record and reproduce content data such as AV (audio visual) data in digital form.

Unlike analog data, digital AV content data maintain their high levels of sound and image quality. The digital data are also noted for little degradation in quality when copied and reproduced. These features call for strict copy control measures from the viewpoint of implementing adequate copyright protection.

One conventional copy control technique is known as SCMS (Serial Copy Management System). This technique involves writing recording control information called CCI (Copy Control Information) together with content data to recording media such as CDs (Compact Discs) or MDs (Mini Discs). When CCI-supplemented content is packetized and sent from a transmitting apparatus (acting as a player) illustratively over an IEC 60958 digital transmission channel to a receiving apparatus (acting as a recorder), the CCI is placed in packets so that the receiving apparatus during recording will carry out copy control based on what is defined by the CCI.

At present, the CCI defines three categories of copy: "Copy Freely," which means content may be copied unlimitedly; "Copy One Generation," which means content may be copied for one generation only; and "Copy Never," which means no copy is allowed.

Another conventional copy control technique is known as DTCP (Digital Transmission Content Protection). This technique has been adopted to carry out authentication and transmission stream encryption between apparatuses that exchange content data illustratively over an IEEE 1394 transmission channel after retrieval from SACD (Super Audio CD) or DVD (Digital Versatile Disc) media, whereby unlimited content data transmission is supposed to be thwarted.

DTCP also involves the use of the CCI that stipulates the sole definition of "Copy No More" upon transmission.

As it is becoming even more commonplace to record AV content data digitally from now on, the desire of copyright holders to better protect their copyrights is expected to grow. The manners and techniques such as the CCI by which to protect copyrights are expected to diversify further.

CCI-based copy control techniques, however, have some disadvantages. In operation, an apparatus on the transmitting side reads the CCI from a recording medium and packetizes it together with retrieved content data before sending the packets over a transmission channel in response to a reproduction request from another apparatus on the receiving side. That means CCI-based copy control is executed in a manner totally dependent on the receiving apparatus.

If more CCI variations are to be adopted from now on in keeping with the diversifying measures and techniques for copyright protection, these variations must be accommodated by the receiving apparatus whose settings need to be changed for copy control every time such a variation is added. This, however, is very difficult to accomplish. As long as conventional copy control techniques are used in conjunction with the CCI, copy control cannot be performed in a manner effectively embracing any newly added CCI variations.

Furthermore, with future CCI definitions expected to become more diversified, the recording and reproducing operations reflecting such definitions will be carried out in a more sophisticated manner than before. With such developments coming into sight, relying solely on the receiving apparatus for implementation of adequate copy management is an unrealistic proposition.

SUMMARY OF THE INVENTION

In solving the foregoing and other problems of the related art and according to one aspect of the invention, there is provided a data converting apparatus which inputs packet data made of content data supplemented with recording control information to be referenced upon recording of the content data and which outputs the input packet data to another apparatus, the data converting apparatus including: an inputting element for inputting the packet data;
a separating element for separating the content data and the recording control information from the packet data input by the inputting element;
a determining element for determining whether the separated recording control information constitutes a value matching any one of values in a first value group;
a replacing element for replacing the recording control information with any one value from the first value group depending on the value constituted by the separated recording control information;
a generating element for generating the packet data by supplementing the content data with the recording control information to be referenced upon recording of the content data;
an outputting element for outputting the packet data to the other apparatus; and
a controlling element which, if the determining element determines that the recording control information separated by the separating element constitutes a second value different from any one of the values in the first value group, then causes the generating element to supplement the content data separated by the separating element with that one of the values in the first value group which is used by the replacing element to replace the second value constituted by the recording control information, the controlling element further causing the outputting element to output the packet data generated by the generating element.

According to another aspect of the invention, there is provided a data converting method for causing a data converting apparatus to input packet data made of content data supplemented with recording control information to be referenced upon recording of the content data and for outputting the input packet data from the data converting apparatus to another apparatus, the data converting method including the steps of: inputting the packet data;
separating the content data and the recording control information from the packet data input in the inputting step;
determining whether the separated recording control information constitutes a value matching any one of values in a first value group;
replacing the recording control information with any one value from the first value group if the determining step determines that the separated recording control information constitutes a second value different from any one of the values in the first value group;

generating the packet data by supplementing the separated content data with the recording control information to be referenced upon recording of the content data; and outputting the packet data to the other apparatus.

According to a further aspect of the invention, there is provided a recording medium which records a program for causing a data converting apparatus to input packet data made of content data supplemented with recording control information to be referenced upon recording of the content data and for outputting the input packet data from the data converting apparatus to another apparatus, the program including the steps of:

inputting the packet data;

separating the content data and the recording control information from the packet data input in the inputting step;

determining whether the separated recording control information constitutes a value matching any one of values in a first value group;

replacing the recording control information with any one value from the first value group if the determining step determines that the separated recording control information constitutes a second value different from any one of the values in the first value group;

generating the packet data by supplementing the separated content data with the recording control information to be referenced upon recording of the content data; and outputting the packet data to the other apparatus.

Other objects, features and advantages of the invention will become more apparent upon a reading of the following description and appended drawings.

BRIEF DESCRIPTION OF THE DRAWINGS

FIG. 4 is a tabular view listing CCI definitions stipulated for this embodiment;

FIG. 5 is a data structure diagram showing copy count correspondence information recorded in the disc playing unit 1 embodying the invention;

FIG. 7 is another flowchart of steps carried out by the inventive disc playing unit 1;

DETAILED DESCRIPTION OF THE PREFERRED EMBODIMENTS

What follows is a description of how this invention is carried out illustratively as a communication unit constituting a disc playing unit for reproducing data from a disc recording medium.

Figure 1:
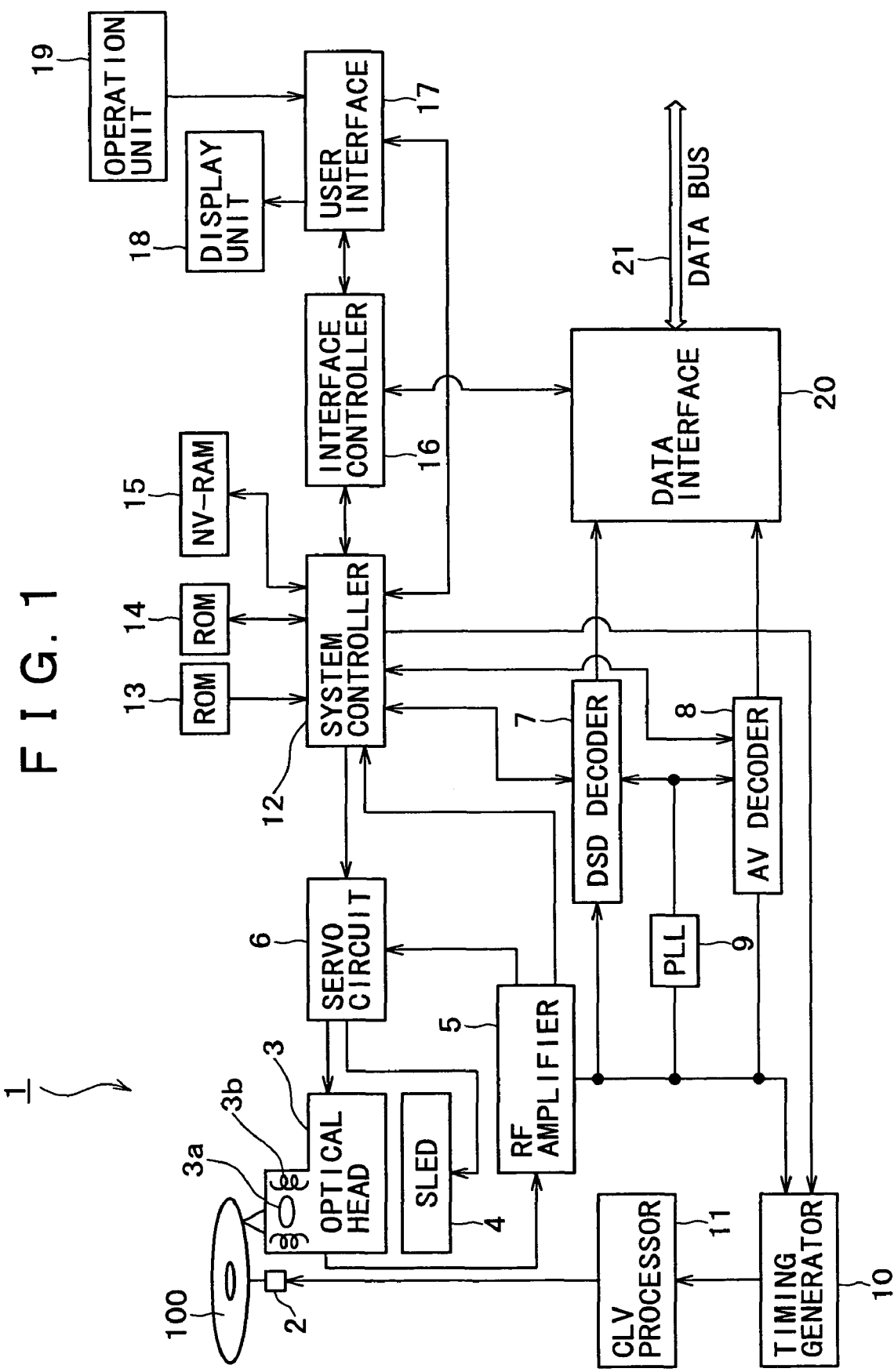
FIG. 1 is a block diagram showing a typical internal structure of a disc playing unit doubling as a communication unit and practiced as an embodiment of this invention.

FIG. 1 is a block diagram showing a typical internal structure of a disc playing unit 1 doubling as a communication unit and practiced as an embodiment of this invention.

The disc playing unit 1 in FIG. 1 is compatible illustratively with CDs (Compact Discs), SACDs (Super Audio CDs), and DVDs (Digital Versatile Discs) and can reproduce data from the loaded disc of any of these disc types. Audio data reproduced from the loaded disc are transmitted by the disc playing unit for output over a data bus 21.

As is well known, the audio data reproduced from CDs are linear PCM data sampled at the sampling frequency of 44.1 kHz and quantized in 16 bits.

The data reproduced from a DVD may include video data as well as audio data.

The SACD is a type of recording medium that utilizes a one-bit digital audio signal method (Direct Stream Digital, or DSD) based on what is known as delta sigma modulation. A DSD signal constitutes one-bit-quantized PCM audio data sampled at a sampling frequency 64 times as high as that of the CD (fs=44.1 kHz). As such, the SACD permits signal reproduction well beyond the audio-frequency region.

The disc playing unit 1 has a DSD signal-compatible decoding function that complies with the SACD.

In FIG. 1, a disc 100 is any one of CDs, SACDs or DVDs and has content data such as audio and video data recorded thereon. When loaded into a reproducible position for reproduction, the disc 100 is rotated by a spindle motor 2 illustratively at a constant linear velocity (CLV) or under a similar revolution control scheme. An optical head 3 reads data that are recorded in embossed pits, phase change pits, dye change pits, etc., on the disc 100. The retrieved data are sent from the optical head 3 to an RF amplifier 5. In the optical head 3, an objective lens 3a is retained by a dual axis mechanism 3b in a manner movable in the tracking and focusing directions.

The optical head 3 can be moved by a sled mechanism 4 in the radial direction of the disc 100.

The RF amplifier 5 generates a reproduced RF signal as well as a focus error signal and a tracking error signal. These error signals are supplied to a servo circuit 6.

Given the focus error signal and tracking error signal, the servo circuit 6 generates drive signals such as a focus drive signal, a tracking drive signal and a sled drive signal so as to control the dual axis mechanism 3b and sled mechanism 4 in operation. That is, the servo circuit 6 provides focus servo control and tracking servo control.

The reproduced RF signal binarized by the RF amplifier 5 is also output to a timing generator 10. Based on the waveform timing of the reproduced RF signal, the timing generator 10 generates a timing signal and sends the generated signal to a CLV processor 11. Given the timing signal, the CLV processor 11 generates a drive signal in a manner controlling the spindle motor 2 at a predetermined CLV, and feeds the generated drive signal to the spindle motor 2. These arrangements implement spindle servo control whereby the disc 100 is rotated at CLV.

A system controller 12 controls the servo circuit 6 and timing generator 10 in such a manner that start and stop of the spindle motor, servo settling, track jumps, track access, and other necessary processes are suitably carried out.

The reproduced RF signal is also sent to a DSD decoder 7 and an AV decoder 8.

The system controller 12 provides control in such a manner that the AV decoder 8 functions upon data reproduction from a CD or a DVD and that the DSD decoder 7 operates upon data reproduction from an SACD.

Given the binarized signal reproduced from the CD (equivalent to an EFM signal in this example), the AV decoder 8 subjects the signal to EFM demodulation, error correction decoding, and descrambling. Fed with the binarized signal reproduced from the DVD (equivalent to an EFM+ signal), the AV decoder 8 submits the signal to EFM+ demodulation, error correction decoding, and descrambling.

In like manner, the AV decoder 8 decodes illustratively audio data quantized in 16 bits and sampled at the sampling frequency of 44.1 kHz. The decoded data are supplied to a data interface 20.

The AV decoder 8 also doubles as a video decoder that decodes video signals upon data reproduction from the DVD.

The DSD decoder 7 decodes a DSD signal from the binarized signal reproduced from the SACD. The DSD signal thus decoded is sent to the data interface 20.

The SACD is a disc that has a two-layer recording structure on the recording side. On some SACDs, one layer stores DSD data and the other layer accommodates CD data. The CD data reproduced from one of the recording layers on the SACD are decoded by the AV decoder 8.

The AV decoder 8 and DSD decoder 7 are structured so as to extract sub-data such as TOC (Table of Contents) and CCI (Copy Control Information) from the disc as opposed to the main data such as audio/video data.

Of these sub-data, the TOC is fed to the system controller 12 for various control purposes.

The CCI is supplied to the system controller 12 for use in copy control processes that will be discussed later with reference to FIGS. 6 through 9.

In this specification, the CCI refers generically to recording control information that is written into the sub-code on the CD or to a predetermined location in each frame on the DVD or SACD.

The reproduced RF signal binarized by the RF amplifier 5 is also sent to a PLL circuit 9.

The PLL circuit 9 outputs a clock synchronized with the channel bits of an input EFM signal. This clock is used illustratively by signal processing circuits downstream of the DSD decoder 7 and AV decoder 8.

The audio data decoded and input to the data interface 20 are converted into a predetermined transmission format. The converted data are then output over the data bus 21 for transmission to an external unit.

DSD data output for transmission are encrypted using an encryption key designated by an interface controller 16 with regard to the data.

The system controller 12 has a ROM 13, a RAM 14, and a CPU (not shown), and carries out the diverse control operations outlined above.

The ROM 13 stores programs that are used to implement various operations of the disc playing unit 1. With this embodiment, the ROM 13 specifically retains programs which cause the system controller 12 to carry out the steps in FIG. 6 through 9, to be described later.

The RAM 14 accommodates as needed those data and programs that may be required by the system controller 12 in executing various processes.

The system controller 12 reads management information (i.e., TOC) from the disc 100 illustratively when the disc is loaded. Given the management information, the system controller 12 determines the number of tracks, their addresses on the disc 100, etc., for control of data reproduction from the disc 100.

More specifically, when the disc 100 is loaded, the system controller 12 first extracts TOC information by reading data from the radially innermost region of the disc called the lead-in area. The TOC information thus retrieved is placed illustratively into the RAM 14 for reference during subsequent read operations on the disc 100.

The system controller 12 has another memory called an NV-RAM 15.

The NV-RAM 15 is a nonvolatile memory that accommodates information needed by the system controller 12 in carrying out diverse control operations.

With this embodiment, the NV-RAM 15 retains data that are referenced during CCI-based copy control processing, to be described later.

The system controller 12 is connected communicably with the interface controller 16 and a user interface 17.

The user interface 17 controls the user's operations and the output of displays in response to user prompts. That is, the user interface 17 admits information from an operation unit 19.

The operation unit 19 is constituted illustratively by keys. Operating on the operation unit 19 produces operation information that is sent to the system controller 12 through the user interface 17.

The system controller 12 carries out various control processes to execute relevant operations responding to the operation information entered as described above.

The system controller 12 also issues instructions to the user interface 17 in such a manner as to provide displays that reflect command signals issued, operation information entered, and operation status currently in effect. Given the instructions, the user interface 17 causes a display unit 18 to give corresponding displays.

Illustratively, the display unit 18 displays: time information such as the total playing time of the loaded disc and the elapsed time of the recording or reproduction performed; name information such as track numbers, disc name and track names; and status information such as operation status and a current operation mode.

The interface controller 16 primarily controls the data interface 20 regarding communication operations over the data bus 21. The interface controller 16 also carries out authentication upon transmission of data in keeping with a given transmission format, encryption key generation, and formatting.

As mentioned above, the interface controller 16 packetizes DSD data or digital audio/video data from the DSD decoder 7 or AV decoder 8, and converts the packetized data to the predetermined transmission format.

During conversion of the digital data to the transmission format, the interface controller 16 supplements the packets with the CCI fed from the system controller 12 as discussed above.

The data interface 20 receives data such as commands and responses from an external unit, and transmits commands and responses to that external unit. The interface controller 16 performs processes necessary for the commands and responses to be exchanged between the data interface 20 and the external unit.

With this embodiment, the data transmission format compatible with the data interface 20 is not limited to any specific format.

Illustratively, the IEEE 1394 format is an AV (audio visual) data transmission format widely utilized today. It is also conceivable to define under IEEE 1394 criteria a new format in which to add the CCI to data packets for use with this embodiment. Alternatively, when a new format for AV data transmission is defined in the future, the embodiment of the invention may be suitably arranged to comply with that format.

Figure 2:
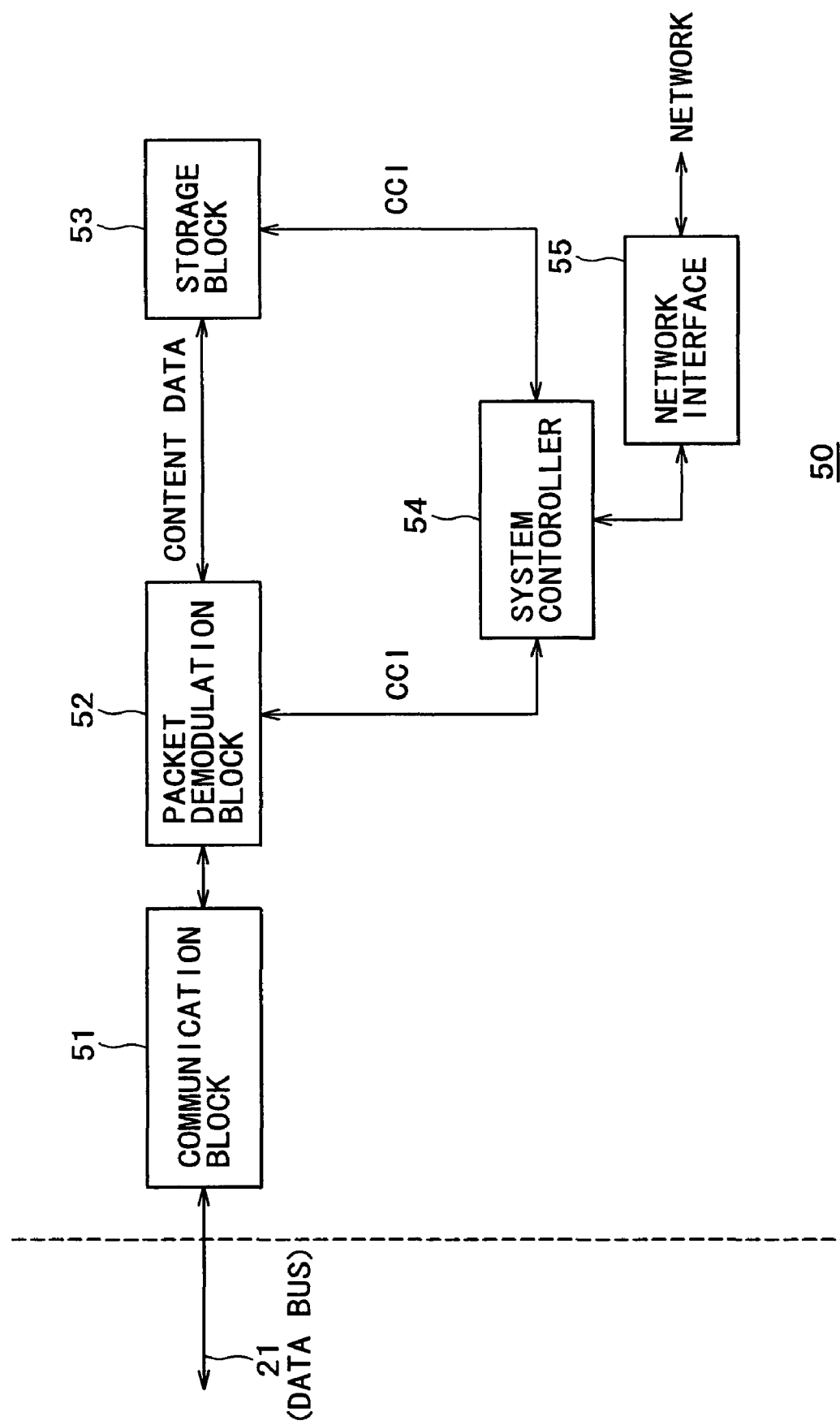
FIG. 2 is a block diagram depicting a typical internal structure of an external unit 50 envisaged by the embodiment of the invention.

An external unit 50 shown in FIG. 2 is what is envisaged by this embodiment as the external unit to be connected to the above-described disc playing unit 1 via the data bus 21.

In a typical internal structure of the external unit 50 shown in FIG. 2, only those signal processing blocks that handle content data and the CCI are indicated in simplified form.

When connected to the disc playing unit 1, the external unit 50 for use with this embodiment is capable of copying content data reproduced from the disc 100 by the disc playing unit 1.

When copying such content data, the external unit 50 can control its recording operation based on the CCI sent from the disc playing unit 1.

In FIG. 2, a communication block 51 permits data exchanges with the disc playing unit 1 connected through the data bus 21.

The communication block 51 also encrypts and decrypts DSD data. As such, the communication block 51 is functionally equivalent to the interface controller 16 and data interface 20 shown in FIG. 1.

A packet demodulation block 52 performs a packet demodulation process on a data transmission stream coming from the communication block 51. DSD data or digital audio/video data derived from the packet demodulation process are fed to a storage block 53. At the same time, the CCI extracted from the packets is sent to a system controller 54 as depicted in FIG. 2.

The storage block 53 is either a disc drive compatible with such removable media as the CD-R (recordable), MD (Mini Disc) and DVD-RAM, or a hard disc drive (HDD). Under control of the system controller 54, the storage block 53 records the DSD data or digital audio/video data supplied from the packet demodulation block 52.

The system controller 54 provides overall control of the external unit 50. Illustratively, the system controller 54 carries out control processes causing the communication block 51, packet demodulation block 52 and storage block 53 to operate as described above.

In particular, the system controller 54 controls the storage block 53 in a manner reflecting the definitions of the CCI coming from the packet demodulation block 52. In that case, the system controller 54 deals with only three types of CCI settings, i.e., "Copy Freely," "Copy One Generation," and "Copy Never" as mentioned earlier.

In other words, the external unit 50 envisaged by this embodiment need only have a copy control function that complies with the CCI bit settings being used at present.

The external unit 50, as illustrated, has a network interface 55. This interface permits data communication with a server connected to the external unit 50 through an appropriate network such as the Internet.

What follows is a description of the CCI that defines copy control operations taking place between the disc playing unit 1 embodying this invention and the external unit 50.

The CCI transmitted over the data bus 21 is a set of information made up of a predetermined number of bits or bytes. Of these bits (bytes) constituting the CCI, certain low-order bits (bytes) define one of multiple types of copy control in use, as shown in FIG. 4.

Illustratively, a low-order bit (byte) value representing type 1 defines "Copy Freely"; a low-order bit (byte) value denoting type 2 defines "Copy One Generation"; and a low-order bit (byte) value specifying type 3 defines "Copy Never."

These three types of copy control defined by the CCI bits have been used conventionally as discussed earlier.

This embodiment of the invention proposes new CCI settings representing type 4, type 5 and type 6 in addition to the conventional types 1 through 3.

Type 4, as shown in FIG. 4, defines "No Copy for Fixed Period," which means no copy is allowed for a fixed period of time; type 5 defines "Copy Fixed Times," which means a limited number of copies are allowed; and type 6 defines "Copy by Licensing," which means a copy is allowed if licensed.

More specifically, the CCI setting denoting type 6 copy control signifies that recording of content data by an external unit is permitted if legitimate right information is granted to the side of the external unit. The right information in this context is what is known as license information needed to record the content data furnished with type 6 CCI bits. Users who wish to copy the type 6 CCI-equipped content data must acquire in advance the license information corresponding to the data for their external unit 50.

With this embodiment, the external unit 50 is assumed to access a suitable server located on a network such as the Internet in order to obtain the license information. Alternatively, a recording medium on which to record content data should be provided with license information beforehand. When that medium is purchased and loaded into the external unit 50, the license information is acquired by the external unit 50 preparatory to recording.

Of the CCI bit types newly defined for this embodiment, types 4 and 5 each require using additional information constituted by a predetermined number of high-order bits (or bytes).

For example, the type 4 setting for "No Copy for Fixed Period" includes a high-order bit (byte) value constituting time-limit information that designates the time and date at which the copy inhibit period ends.

Likewise, the type 5 setting for "Copy Fixed Times" includes a high-order bit (byte) value constituting maximum copy count correspondence information that designates the maximum number of times a copy can be made.

Of the CCI settings for use with this embodiment, type 5 for "Copy Fixed Times" requires the disc playing unit 1 to have a feature for retaining the number of times the target content data have been copied so far. This feature is implemented with the disc playing unit 1 using the NV-RAM 15 shown in FIG. 1. The NV-RAM 15 stores copy count correspondence information in a manner indicated in FIG. 5.

Figure 5:
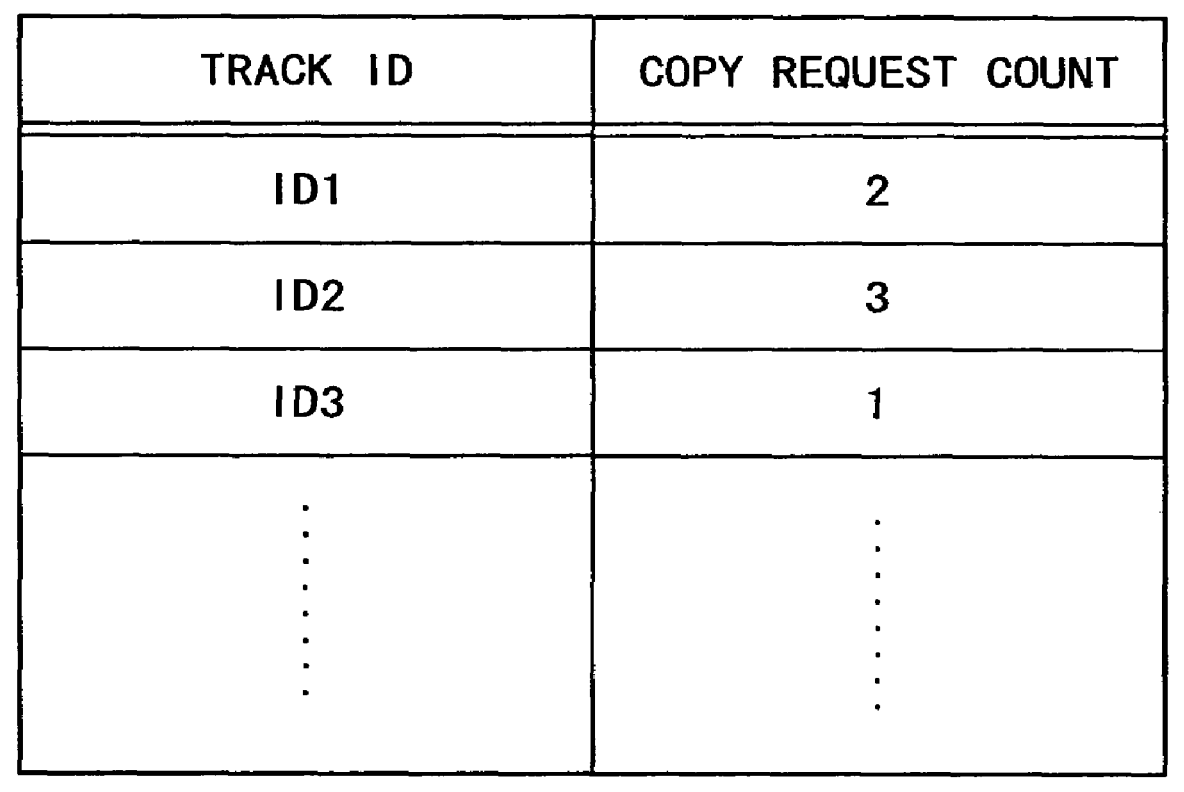

The copy count correspondence information associates each of track IDs identifying individual content data items on a disc with the number of times the corresponding content data item has been requested to be copied so far, as shown in FIG. 5.

More specifically, every time the external unit 50 makes a copy request causing a track carrying the desired content data item to be reproduced, the track ID identifying the reproduced track is recorded, and a copy request count corresponding to the copied content data item is incremented by one.

Given a track ID, the system controller 12 can verify how may times the corresponding track (i.e., content data item) has been copied (requested) so far, by referencing the relevant copy count correspondence information.

Track IDs are acquired illustratively in one of two ways based on the TOC information held on the disc 100 as described below.

Track IDs can be generated from the TOC data on the CD.

The TOC data on each CD include the number of tracks (or tunes) recorded on the CD, the address (or absolute time information) of each of the tracks, and a total playing time of the CD. All CDs of the same time carry the same TOC data, and it is extremely unlikely that CDs of different titles would carry identical TOC data. This makes it possible to generate a code unique to a given CD title based on its TOC data.

Illustratively, a start track number, a last track number, addresses of the tracks, and the total playing time of the disc are extracted from the TOC data. The extracted values are either merged or subjected to individual computations in order to obtain a unique code value.

This code value serves as a unique identifier of the loaded CD. Combining this identifier with the value of a given track number produces a track ID unique to each track on the disc.

Track IDs can be generated from ISRC information.

Each CD title is furnished with an ISRC code as a copyright management code for the album as whole or for each of the tunes recorded on the CD. The ISRC code is provided as code data unique to each CD title. The ISRC code can thus be used unmodified as a CD identifier, or can be subjected to special computations with the computed result used as a CD identifier.

Combining this CD identifier with the value of a given track number produces a track ID unique to each track as in the case above.

Figure 3:
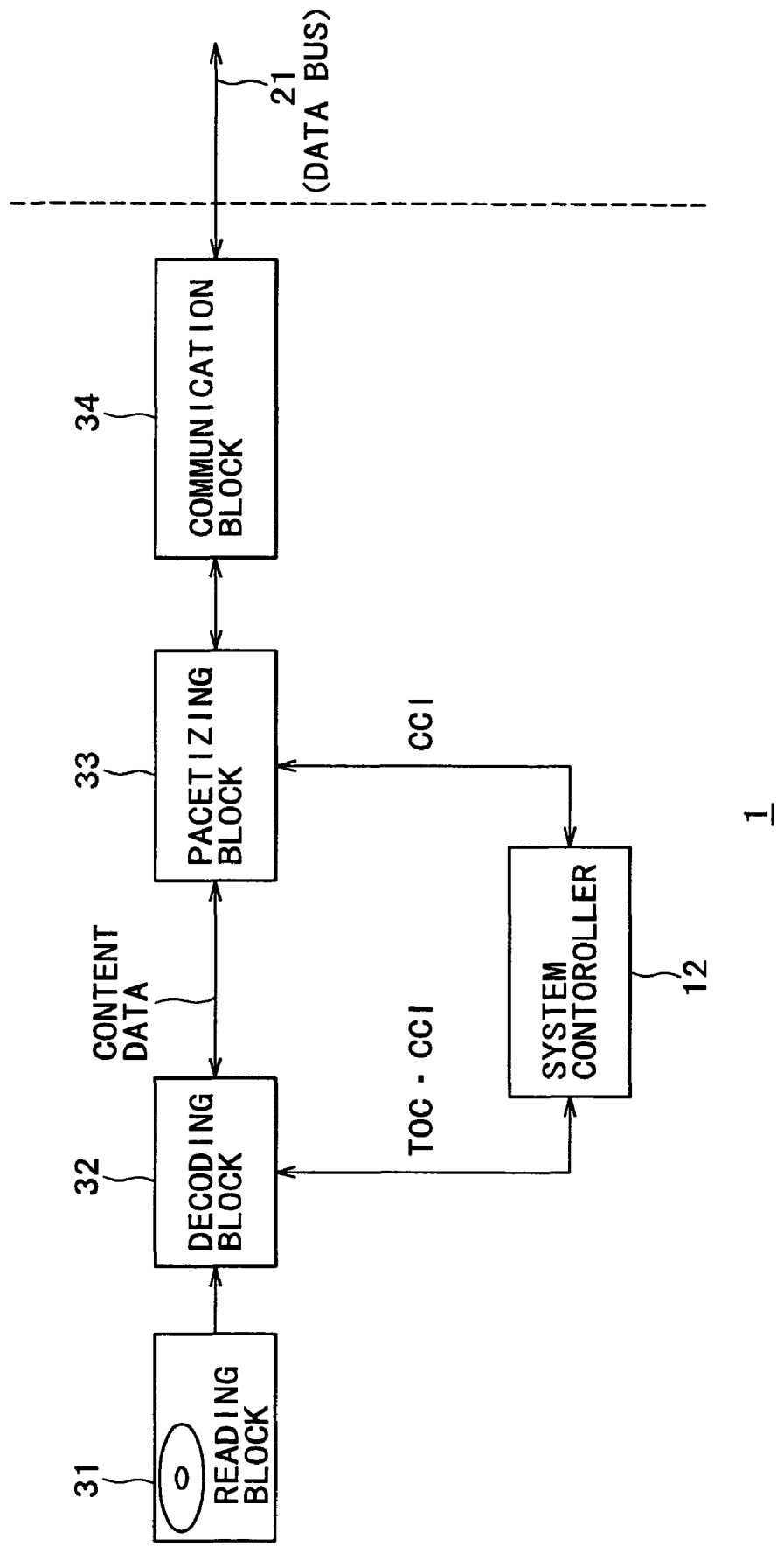
FIG. 3 is a partial block diagram indicating simply those blocks of the disc playing unit embodying the invention which handle data retrieved from a disc 100.

Described below with reference to FIG. 3 is what the inventive disc playing unit 1 does in accordance with the CCI definitions set as described above.

FIG. 3 is a partial block diagram indicating simply those blocks of the disc playing unit 1 in FIG. 1 which handle data retrieved from the disc 100.

In the setup of FIG. 3, a data reading block 31 is constituted primarily by the optical head 3 and RF amplifier 5 in FIG. 1. This is a block that reads signals from the disc 100.

A decoding block 32 corresponds mainly to the DSD decoder 7 and AV decoder 8 in FIG. 1. This is a block that decodes the signal (i.e., reproduced signal) from the data reading block 31 into digital audio data sampled at the sampling frequency of 44.1 kHz and quantized in 16 bits, into digital video data, or into DSD data. At the same time, the decoding block 32 extracts TOC information and the CCI from the reproduced signal and supplies what is extracted to the system controller 12.

A packetizing block 33 corresponds to the interface controller 16. This is a block that packetizes the digital audio data and DSD data supplied by the decoding block 32 and converts the packetized data to the predetermined transmission format.

A communication block 34 corresponds to the data interface 20. This is a block that exchanges stream data with the external unit 50 connected to the disc playing unit 1 through the data bus 21.

How the disc playing unit 1 embodying the invention works is outlined below by referring to FIG. 3. The reading block 31 first reads data from the disc 100 and feeds the retrieved data to the decoding block 32. Of the retrieved data, the TOC and the CCI are forwarded to the system controller 12 as illustrated while the content data are fed to the packetizing block 33.

The system controller 12 determines the type of the CCI bits supplied as described. If the CCI bit value is found to represent any one of types 1 through 3 shown in FIG. 4, the system controller 12 allows the supplied CCI to be sent unmodified to the packetizing block 33. That is, if it is determined that the CCI bits are of conventional nature, i.e., that the bits are such as to be interpretable by the external unit 50, then the system controller 12 attaches the unchanged CCI bits to the content data which are then sent together to the external unit 50.

If the CCI bits fed from the decoding block 32 are found to denote one of types 4 through 6, the system controller 12 determines whether the condition stipulated by these CCI bits is met. The system controller 12 then generates CCI bits representing one of types 1 through 3 in a manner reflecting whether or not the attached condition is met, the generated CCI bits being such as to be interpretable by the external unit 50.

For example, suppose that the supplied CCI bits constitute the value specifying type 4 copy control "No Copy for Fixed Period." In that case, the system controller 12 determines whether a certain period stipulated by the type 4 CCI bits has elapsed. If the period is not found to have elapsed, the system controller 12 generates the CCI bits corresponding to type 3 copy control "Copy Never." If the period is found to have elapsed, the system controller 12 generates, say, the CCI bits representing type 2 copy control "Copy One Generation."

With the CCI setting thus converted upstream, the external unit 50 not compatible with the type 4 CCI bits can exercise copy control in a manner reflecting what is effectively specified by the type 4 CCI bits.

Suppose also that the supplied CCI bits constitute the value specifying type 5 copy control "Copy Fixed Times." In that case, the system controller 12 determines whether the copy request count (shown in FIG. 5) for the CCI-furnished content data of interest has been exceeded. The system controller 12 then generates CCI bits representing one of types 1 through 3 in a manner reflecting whether or not the copy count condition is met, the generated CCI bits being such as to be interpretable by the external unit 50.

Likewise, suppose that the supplied CCI bits constitute the value specifying type 6 copy control "Copy by Licensing." In that case, the system controller 12 determines whether legitimate license information has been acquired for the CCI-furnished content data of interest. The system controller 12 then generates CCI bits representing one of types 1 through 3 in a manner reflecting the result of the check on whether or not the license information has been acquired, the generated CCI bits being such as to be interpretable by the external unit 50.

In each of the three examples above in which the CCI bits not addressed by the external unit 50 are provided, the disc playing unit 1 determines whether the condition represented by the bits is met. The disc playing unit 1 then generates CCI bits representing one of types 1 through 3 in a manner reflecting whether or not the attached condition is met, the generated CCI bits being such as to be interpretable by the external unit 50. When the external unit 50 executes copy control based on the converted CCI bits denoting any one of types 1 through 3, the disc playing unit 1 and the external unit 50 exercise in combination copy control operations corresponding effectively to the newly added types 5 and 6 copy control settings.

Described below with reference to the flowcharts of FIGS. 6, 7, 8 and 9 is what the system controller 12 shown in FIGS. 1 and 3 does in order to implement copy control operations between the above-described disc playing unit 1 and the external unit 50.

Figure 6:
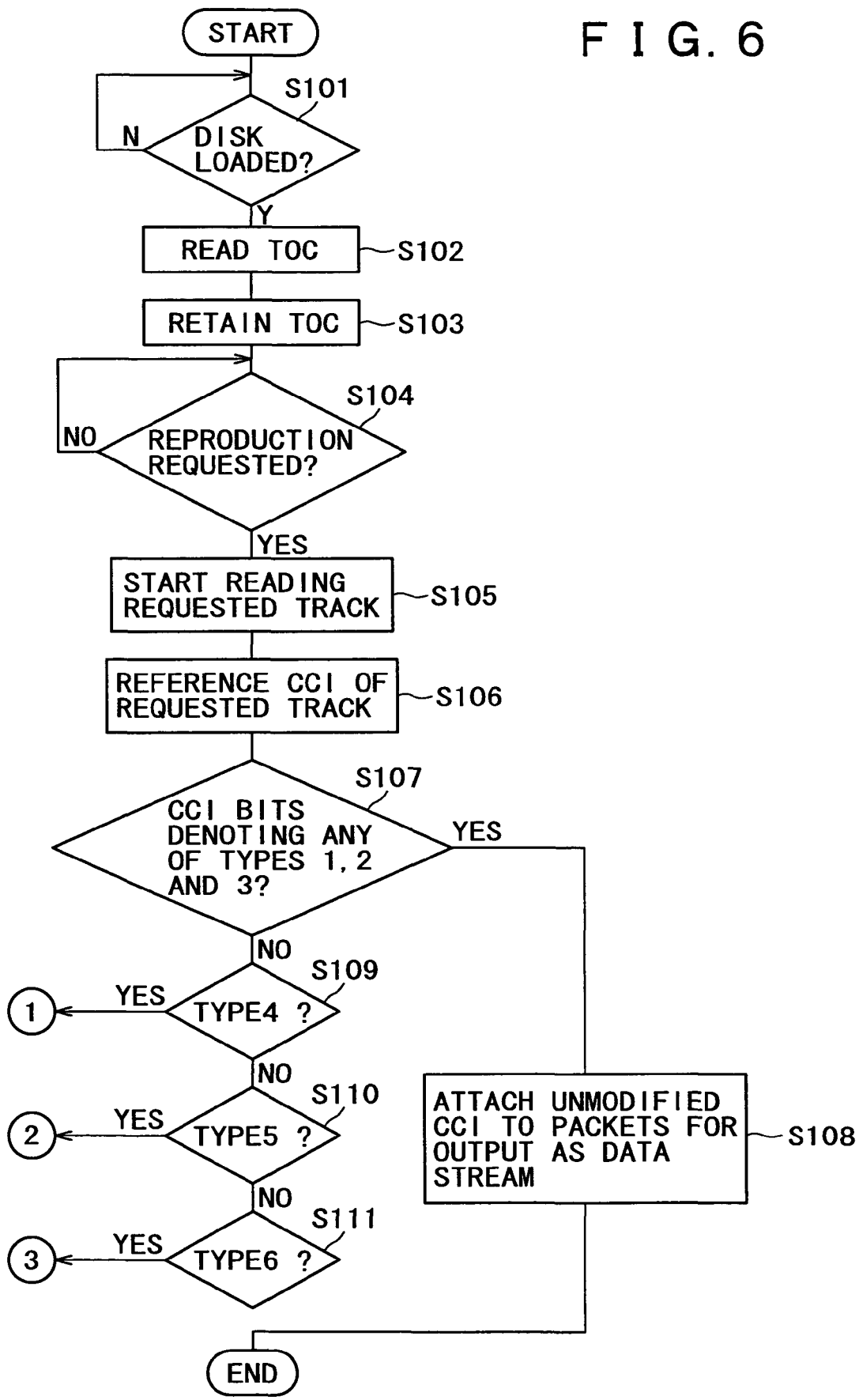
FIG. 6 is a flowchart of steps carried out by the inventive disc playing unit 1.

FIG. 6 is a flowchart of steps performed by the disc playing unit 1 in determining the type of the CCI bits read from the disc 100. This flowchart also includes steps that are carried out if the CCI bits retrieved from the disc 100 are found to denote one of the conventional copy control types 1 through 3.

In step S101 of FIG. 6, the system controller 12 determines whether the disc 100 is loaded into a reproducible position of the disc playing unit 1. If the disc 100 is found loaded in the reproducible position, step S102 is reached. In step S102, data are read from the lead-in area of the disc 100 so that TOC information is retrieved, as discussed above with reference to FIG. 1.

In step S103, the TOC information thus retrieved is retained illustratively in the RAM 14 shown in FIG. 1.

In step S104, the system controller 12 checks for a reproduction request from the external unit 50 connected to the disc playing unit 1 via the data bus 21, the external unit 50 thereby requesting reproduction of content data from the disc 100.

If a reproduction request from the external unit 50 is detected in step S104, step S105 is reached. In step S105, the system controller 12 causes a read operation to be performed on the requested track on the basis of track number information designated in the reproduction request. In step S106, the system controller 12 causes the DSD decoder 7 or AV decoder 8 to extract the CCI from the retrieved data and references the extracted CCI.

In step S107, the system controller 12 determines the type of the CCI bits referenced in step S106. More specifically, a check is made to see whether or not the low-order bit value in the referenced CCI corresponds to one of three copy control types, i.e., type 1 for "Copy Freely," type 2 for "Copy One Generation," or type 3 for "Copy Never."

In other words, the check in step S107 determines whether the referenced CCI bits are those interpretable by the external unit 50, or some other CCI bits not addressed by the external unit 50.

If in step S107 the CCI bits are found to denote one of types 1 through 3, then step S108 is reached. In step S108, the CCI bits referenced earlier in step S106 are supplied unmodified to the interface controller 16.

In turn, the interface controller 16 writes the CCI bits to a predetermined data position within the packets. Thus packetized, stream data are output to the external unit 50 through the data interface 20.

In the external unit 50, the packet demodulation block 52 shown in FIG. 2 extracts the attached CCI bits from the stream data received through the communication block 51. The extracted CCI bits are fed to the system controller 54. In turn, the system controller 54 causes the storage block 53 to control recording of the corresponding content data in accordance with the type of the CCI bits.

That is, the external unit 50 carries out its copy control operation based on the CCI setting type referenced in step S106 by the disc playing unit 1.

If the result of the check in step S107 is negative, i.e., if the CCI bits do not correspond to any of the three conventional copy control types 1 through 3, then step S109 and subsequent steps are reached and carried out to see if the low-order bit value of the CCI referenced in step S106 represents any one of the above-described types 4, 5 and 6.

In step S109, a check is made to see if the CCI bits referenced in step S106 correspond to type 4 copy control "No Copy for Fixed Period." If the result of the check in step S109 is affirmative, the processing of FIG. 7 is reached and carried out. If the result of the check in step S109 is negative, i.e., if type 4 copy control is not found applicable, step S110 is reached.

Figure 8:
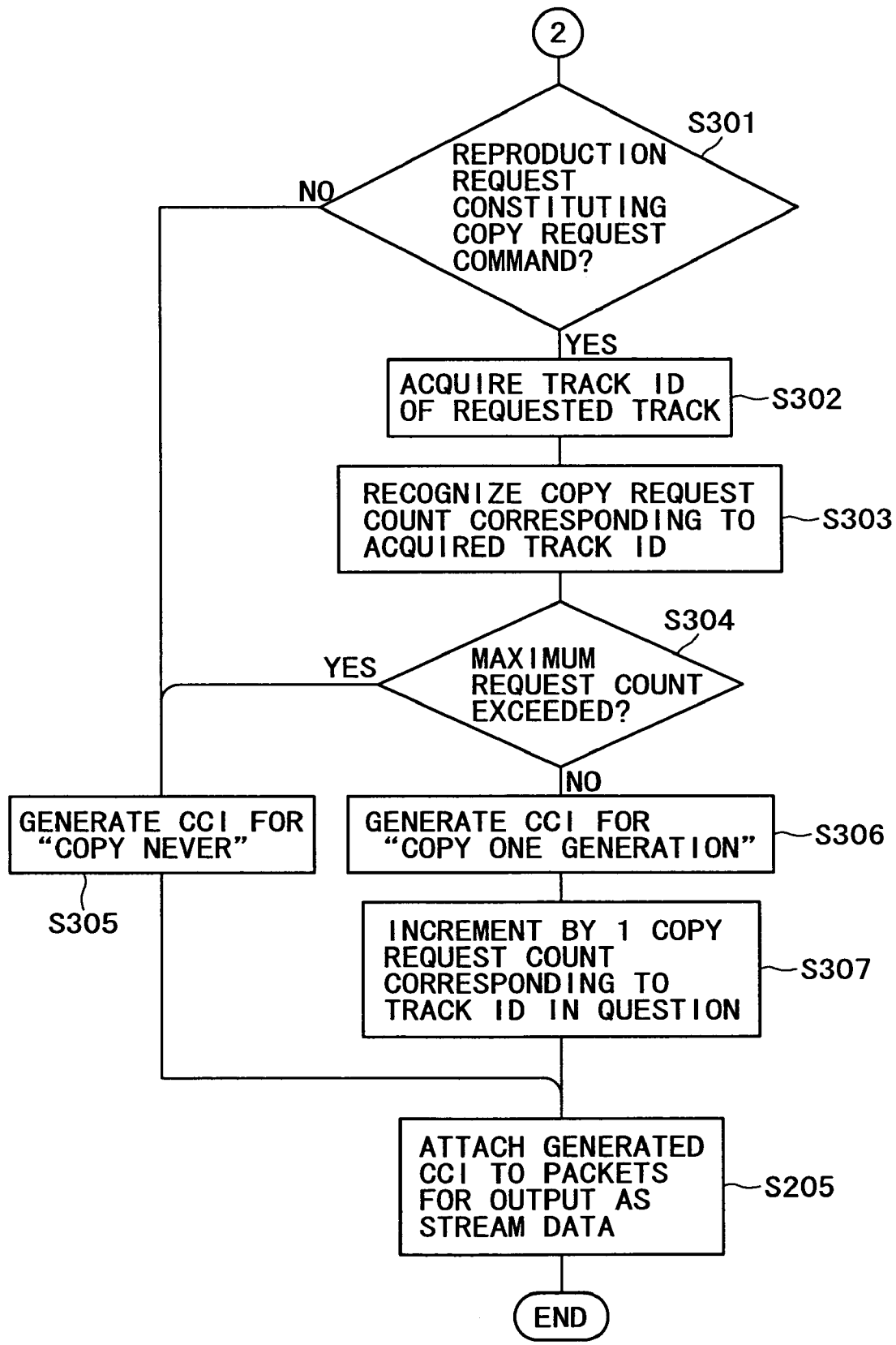
FIG. 8 is another flowchart of steps carried out by the inventive disc playing unit 1.

In step S110, a check is made to see if the CCI bits correspond to type 5 copy control "Copy Fixed Times." If the result of the check in step S110 is affirmative, the processing of FIG. 8 is reached and carried out. If the result of the check in step S110 is negative, i.e., if type 5 copy control is not found applicable, step S111 is reached.

Figure 9:
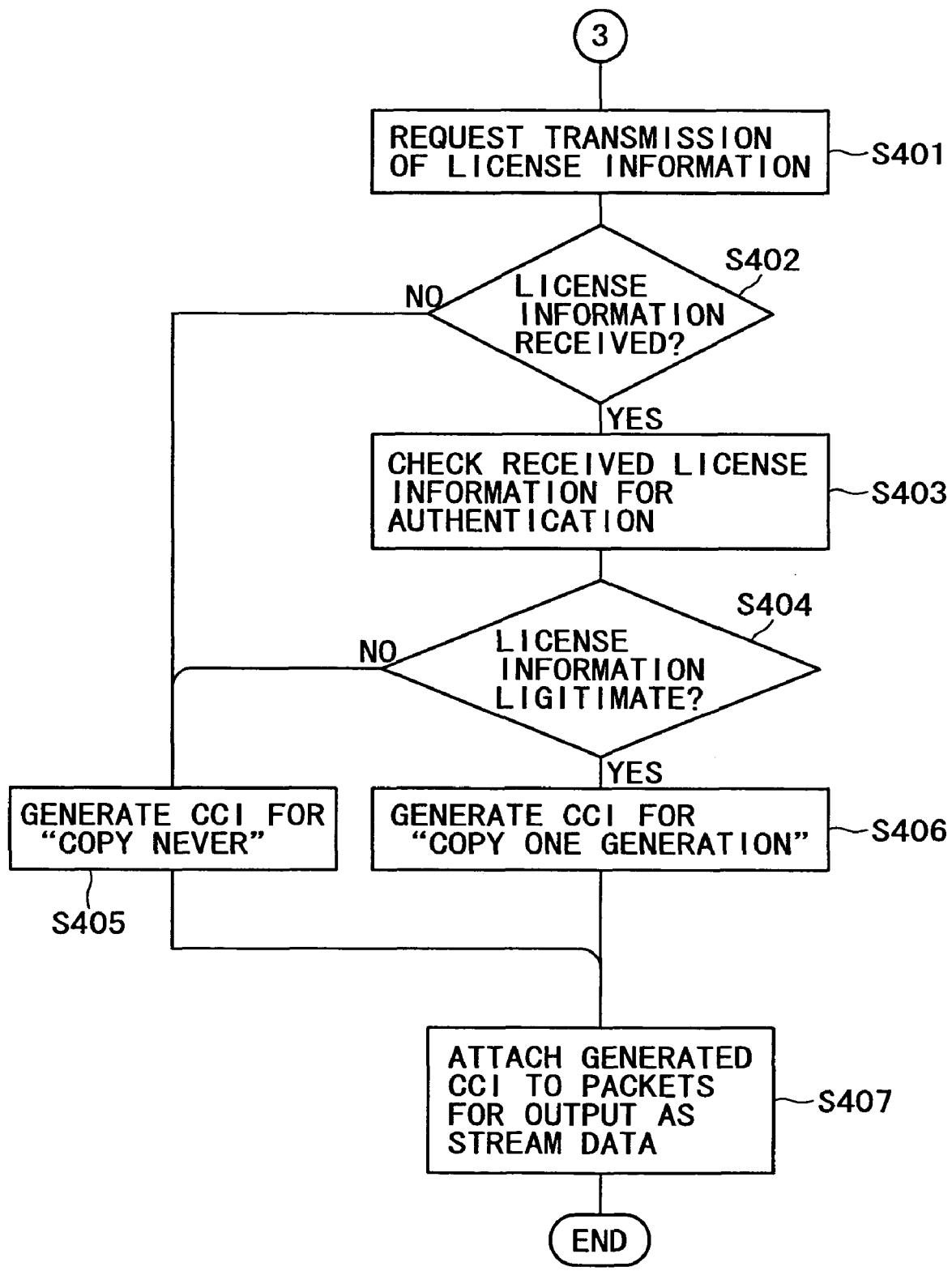
FIG. 9 is another flowchart of steps carried out by the inventive disc playing unit 1.

In step S111, a check is made to see if the CCI bits correspond to type 6 copy control "Copy by Licensing." If the result of the check in step S111 is affirmative, then the processing of FIG. 9 and reached and carried out.

Although not shown in FIG. 6, it might happen that the result of the check in step S111 is negative, e.g., that the CCI bits are something unpredictable and do not correspond to any copy control type. In that case, control is removed from the processing of FIG. 6, and the erroneous state is indicated illustratively by having an error message displayed on the display unit 18 shown in FIG. 1.

When the CCI bits referenced in step S106 are found to represent type 4 copy control, the system controller 12 performs the steps in the flowchart of FIG. 7 as described below.

In step S201 of FIG. 7, no-copy time limit information is read from the high-order bits of the CCI. As discussed earlier, the time limit is designated illustratively as the time of day and the date at which a predetermined time period ends.

In step S202, a check is made to see if the current time has passed the referenced no-copy time limit. For example, the system controller 12 performs this check using an internal clock function that generates current time information.

If in step S202 the no-copy time limit is not found to have elapsed yet, step S203 is reached. In step S203, the system controller 12 generates the CCI corresponding to type 3 copy control "Copy Never" before reaching step S205. In other words, if the current time has not passed the no-copy time limit designated by the time limit information, the system controller 12 generates the CCI bits designating type 3 copy control "Copy Never," whereby copy of the content in question is prohibited.

If in step S202 the current time is found to have passed the referenced no-copy time limit already, the system controller goes to step 204 to generate the CCI corresponding to type 2 copy control "Copy One Generation," and reaches step S205. That is, if the current time has passed the designated no-copy time limit, the system controller 12 allows the content in question to be copied.

While the CCI representing type 2 copy control "Copy One Generation" is shown generated with regard to the no-copy period having expired, this is not limitative of the invention. Alternatively, the CCI denoting type 1 copy control "Copy Freely" may be generated instead.

In step S205, the CCI bits generated in step S203 or S204 are supplied to the interface controller 16.

In this case, as in step S108, the interface controller 16 having received the CCI bits writes these bits into packets. Thus packetized, stream data are output from the data interface 20 to the external unit 50. In turn, the external unit 50 performs the copy control operation on the applicable content data in accordance with the received CCI bits.

The steps above, when carried out, implement effectively the copy control "No Copy for Fixed Period" discussed above in connection with steps S203 and S204.

In step S205, the system controller 12 supplies the CCI bits to the interface controller 16 as described above, and terminates the processing of FIG. 7 as indicated.

FIG. 8 is a flowchart of steps performed by the system controller 12 when the CCI bits referenced in step S106 of FIG. 6 are found corresponding to type 5 copy control "Copy Fixed Times."

In step S301 of FIG. 8, the system controller 12 determines whether a reproduction request received from the external unit 50 in step S104 of FIG. 6 constitutes a command for copying the content of interest. That is, a check is made in step S301 to see whether the reproduction request received through the data interface 20 is simply a reproduction request command, or a copy request command requesting copy of the designated content.

If in step S301 the reproduction request is found simply to be a reproduction request command, step S305 is reached in which the CCI bits denoting type 3 copy control "Copy Never" are generated.

If the reproduction request is found to be a copy request command, then step S302 is reached.

In step S302, the system controller 12 acquires the track ID of the track designated by the reproduction request from the external unit 50 in the manner described earlier with reference to FIG. 5. More specifically, the system controller 12 acquires the track ID of the designated track based illustratively on the CD identifier of the disc 100 generated from its TOC information and on the requested track number.

In step S303, the system controller 12 references relevant copy count correspondence information and thereby recognizes the copy request count corresponding to the track ID acquired in step S302.

More specifically, the system controller 12 in step S303 references the copy count correspondence information recorded in the NV-RAM 15 as shown in FIG. 5, and recognizes the copy count retained there in correspondence with the acquired track ID.

Although not shown in FIG. 8, if the acquired track ID is not found to be part of the copy count correspondence information, the track ID is first written to the NV-RAM 15. The step S306 is then reached and carried out.

In step S304, the system controller 12 determines whether the recognized copy count exceeds the designated allowable copy count.

More specifically, the copy count corresponding to the track ID recognized in step S303 is compared in step S304 with maximum copy count information denoted by the high-order bit value in the CCI of type 5. A check is then made to see if the recognized copy count exceeds the maximum copy count tolerated.

If in step S304 the copy count is found to exceed the maximum copy count, i.e., if the number of times the content data in question have been copied so far has exceeded the predetermined number of times a copy can be made, then step S305 is reached in which the CCI bits denoting type 3 copy control "Copy Never" are generated. Step S305 is followed by step S308.

If in step S304 the copy count is not found to exceed the maximum copy count information, i.e., if the number of times the content data in question have been copied so far has not exceeded the predetermined number of times, then step S306 is reached and the CCI bits representing type 2 copy control "Copy One Generation" are generated. Step S306 is followed by step S307 in which the system controller 12 increments by one the copy request count recorded in correspondence with the acquired track ID. Step S307 is followed by step S308.

The CCI bits generated in step S306 may alternatively be such as to denote type 1 copy control "Copy Freely."

Although the copy count was shown incremented before the content data in question are recorded, this is not limitative of the invention. Alternatively, the copy count may be incremented after confirmation that the designated content data have been normally recorded by the external unit 50.

In step S308, the CCI bits generated in step S305 or S306 are supplied to the interface controller 16.

In this case, too, the interface controller 16 packetizes the content data that have been read in response to the reproduction request and writes the CCI bits into the packets. Thus packetized, stream data are output through the data interface 20 to the external unit 50. In turn, the external unit 50 carries out its copy control operation on the content data of interest in accordance with the CCI bits.

These steps effectively implement the copy control operation of "Copy Fixed Times."

After supplying the CCI bits to the interface controller 16 in step S308 as described above, the system controller 12 terminates the processing in FIG. 8 as indicated.

FIG. 9 shows a flowchart of steps performed by the system controller 12 when the CCI bits referenced in step S106 correspond to type 6 copy control "Copy By Licensing."

In step S401 of FIG. 9, the system controller 12 requests the external unit 50 to transmit license information about content data of interest, the external unit 50 being connected through the data bus 21 and having sent a reproduction request designating the desired content data.

Given the license information transmission request, the external unit 50 checks to see whether the corresponding license information has been acquired. If the license information is found to have been acquired, the external unit 50 transmits the license information to the disc playing unit 1. If the license information has not been acquired yet, the external unit 50 sends the disc playing unit 1 a notice to that effect.

In step S402, the system controller 12 determines what has been received from the external unit 50: the license information corresponding to the request issued in step S401, or the notice saying that the relevant license information is not acquired.

If in step S402 the notice of nonexistence of the license information is found received from the external unit 50, the system controller 12 reaches step S405 to generate the CCI bits denoting type 3 copy control "Copy Never." Step S405 is followed by step S407. In other words, if the license information applicable to the content data of interest is not found acquired, the system controller 12 prohibits copy of the content data by generating the copy-disabling CCI bits.

If in step S402 the license information is found received from the external unit 50, the system controller 12 goes to step S403.

In step S403, the system controller checks the license information for authentication illustratively by performing predetermined computations on the received information.

In step S404, the system controller 12 determines whether the license information is legitimate based on the result of the authentication in step S403.

If in step S404 the license information is found legitimate, the system controller 12 goes to step S406 and generates the CCI bits representing type 2 copy control "Copy One Generation." That is, if the legitimate license information is found to have been acquired by the external unit 50, the system controller 12 permits one-generation copy of the content data in question.

If in step S404 the license information is not found to be legitimate, the system controller 12 reaches step S405 and generates the CCI bits corresponding to type 3 copy control "Copy Never." That is, if the license information acquired by the external unit 50 is not legitimate, the copy of the requested content data is prohibited.

In any case, the CCI bits generated to permit copy of the content data may alternatively be such as to designate type 1 copy control "Copy Freely." In step S407, the CCI bits generated in step S405 or S406 are supplied to the interface controller 16.

Given the CCI bits, the interface controller 16 also writes them into packets as described above. The packetized stream data are then output to the external unit 50 through the data interface 20. Based on the received CCI bits, the external unit 50 carries out accordingly its copy control operation on the content data of interest.

These steps effectively implement the copy control operation of "Copy by Licensing." After supplying the CCI bits to the interface controller 16 in step S407 as described above, the system controller 12 terminates the processing in FIG. 9 as indicated.

As described, the disc playing unit 1 embodying the invention and loaded with the disc 100 first receives a reproduction request for the disc from the external unit 50 connected to the unit 1 through the data bus 21. The disc playing unit 1 then extracts the CCI attached to the content data designated by the reproduction request, determines whether or not the CCI-stipulated condition such as a no-copy time limit or a maximum allowable copy count regarding the requested content is being met, and generates accordingly CCI bits that can be interpreted by the external unit 50 as representative of one of the three conventional copy control types 1 through 3.

The CCI bits thus generated are attached to the content data reproduced by the disc playing unit 1 in response to the reproduction request. The CCI bits are sent to the external unit 50 together with the content data. In turn, the external unit 50 performs one of the three copy control operations, type 1, 2 or 3, in accordance with the CCI bits.

These steps allow the external unit 50 effectively to carry out any one of the extended copy control operations such as "Copy Fixed Times" and "No Copy for Fixed Period" stipulated by the CCI found recorded on the loaded disc 100.

As a result, the embodiment of the invention provides more detailed, more sophisticated copy management with such above-described copy-restricting features as the no-copy time limit and maximum copy request count, than the conventional copy control operations "Copy Freely," "Copy One Generation," and "Copy Never" designated by the CCI bits.

Also as described, the disc playing unit 1 determines whether the more detailed copy condition stipulated by the CCI is being met, before converting the CCI into what can be interpreted by the external unit 50. That means an external unit 50 not compatible with the newly added CCI can still carry out effectively the extended copy control operations.

In other words, the disc playing unit 1 of this invention can be used in combination with the external unit 50 of an earlier model, i.e., one that is not compatible with the newly defined CCI settings. The disc playing unit 1 on the transmitting side maintains what is known as downward compatibility by having the CCI converted as needed for interpretation by the external unit 50 on the receiving side.

The above-described operations of the disc playing unit 1 are implemented by programs held in the ROM 13. It is easy to offer the user these programs if they are recorded on a suitable recording medium that is marketed as a package medium. Offering the necessary programs in the form of the package medium helps facilitate device design and system configuration build-up.

The recording medium for storing the programs may be any one of optical discs including CDs, DVDs and MDs; magnetic discs such as flexible discs; a hard disc drive (HDD); or a memory card formed by a solid-state memory.

Because the disc playing unit 1 of the invention is arranged to provide type 5 copy control "Copy Fixed Times," it is possible strictly to control the number of times a copy can be made by a plurality of external units that may be connected to the unit 1.

Conventionally, for example, the disc playing apparatus or other reproducing apparatus on the transmitting side had the CCI retrieved from content data and sent it unchanged to an external unit. It follows that even if the CCI restricted a maximum allowable copy count, with each external unit duly subjected to the restriction, it was practically impossible to limit a plurality of external units as a whole to the allowable copy count.

With the embodiment of this invention, by contrast, the past copy request count regarding each content data item is managed on the side of the disc playing unit 1. All CCI to be output to the external unit is generated on the basis of the copy request count reached internally so far. Where there exist a plurality of external units each acting as a copy request source, the past copy count of every content data item is commonly applied to all the external units involved. This makes it possible to impose restrictions on the number of copies that can be made of a given content data item for all external units connected.

A variation of the above-described embodiment of the invention is explained below.

A plurality of levels of license may be set in the license information which, in the foregoing description, was shown specifying merely whether or not content data of interest can be copied. If the disc playing unit 1 has a data compression function based on, say, ATRAC (Adaptive Transform Acoustic Coding) or MP3 (MPEG audio layer 3), the disc playing unit 1 may be arranged to output the content data in question either in uncompressed or in compressed form depending on the level of the license acquired by the external unit 50.

That is, this variation of the invention implements copy control operations reflecting the acquired license level by newly establishing, say, type 7 CCI bits.

More specifically, one of two CCI bit settings may be selected: license level A or B. Illustratively, the license level A allows the external unit 50 to copy content only in compressed form, while the license level B permits the external unit 50 to copy content in uncompressed (i.e., normal) format. This variation of the invention works more specifically as follows:

If the CCI bits denoting type 7 copy control are detected and if a reproduction request is received along with a license information transmission from the external unit 50, the system controller 12 checks the received license information for authentication.

If the license is not found legitimate, the system controller 12 generates the CCI bits for type 3 copy control "Copy Never," and sends the generated CCI bits to the external unit 50 together with the content data designated by the reproduction request.

If the license information is found to be legitimate, the system controller 12 recognizes the license level and determines accordingly the type of the CCI bits to be generated and the form in which to copy the content data (i.e., compressed or uncompressed).

Suppose that the license level A is found to have been sent from the external unit 50. In that case, the system controller 12 compresses the content data and generates the CCI bits for, say, type 1 copy control "Copy Freely." The CCI bits are then attached to the content data before being transmitted altogether to the external unit 50. This makes it possible to implement copy control permitting only the copy of compressed data reflecting the license level A.

Suppose now that the license level B is found to have been received. In this case, the system controller 12 does not compress the content data of interest and generates the CCI bits for, say, type 2 copy control "Copy One Generation." The CCI bits are then attached to the content data before being transmitted altogether to the external unit 50. This makes it possible to implement copy control permitting one-generation copy of uncompressed (i.e., normal) data reflecting the license level B.

As described, the variation above of this invention provides more detailed copy management than before in keeping with the level of the license information acquired on the side of the external unit 50.

Although the above variation of the invention was shown dealing with one of the two acquired license levels permitting either uncompressed or compressed copy of content, this is not limitative of the invention. As another variation, there may be provided a setup in which the sampling frequency and the bit count regarding audio data are made adjustable. If the acquired license is on level A in that setup, the sampling frequency may be lowered or the bit count may be reduced to permit only low-quality copy of the audio data; if the acquired license level is B, the sampling frequency and the bit count may be left unchanged to permit high-quality copy of the audio data.

As a further variation, quadruple-speed copy may be permitted for the acquired license level A, and 8× speed copy may be allowed for the acquired level B. Multiple-fold speed copy may be otherwise established and made available depending on the acquired license level.

In the above-described embodiment, the disc playing unit 1 was shown as a reproducing apparatus compatible with CDs, DVDs and/or SACDs. Alternatively, the invention may be practiced with a reproducing apparatus addressing other removable media such as MDs.

In addition to the reproducing apparatuses for reproducing data from the recording media, this invention also applies to apparatuses such as digital satellite broadcast receivers capable of receiving digital content data and outputting the received data to the external unit 50 connected via a digital transmission channel.

In the above-described embodiment of the invention, the disc playing unit 1 and external unit 50 were shown as independent units interconnected via the data bus 21. Alternatively, the two units may be interconnected through an internal bus within the same enclosure, such as a personal computer or a hard disc recorder having a similar internal structure each.

The invention is not applied solely to the wired data communication setups. The invention may also apply to a wireless communication environment involving illustratively the Bluetooth (registered trademark) technology.

The above-described copy control operations stipulated by the different CCI settings are only examples and are not limitative of the invention.

For example, type 4 copy control "No Copy for Fixed Period" may be replaced with a variation similar to it, such as a copy control operation allowing content data to be copied solely in a specific geographical region.

As another example, type 6 copy control "Copy by Licensing" may be replaced with a variation such as a copy control operation allowing the external unit 50 to copy content data from the disc playing unit 1 only if the external unit 50; having requested the disc playing unit 1 to reproduce the content data of interest, is found to be a previously licensed unit or a unit capable of encrypting the content data being recorded.

As described, the embodiment above of the invention extracts recording control information from acquired content data and recognizes what is stipulated by the recording control information. Depending on what is recognized, the embodiment converts the extracted recording control information into a new type of recording control information that can be subsequently interpreted by an externally connected unit carrying out recording control operations on the content data in question. The newly generated recording control information is attached to the content data before they are sent altogether to the external unit.

A major advantage of the inventive scheme above is that even if the recording control information originally attached to the content data stipulates some copy control operation not addressed by the external unit, the recording control information is translated into what is interpretable by the external unit so that the latter can perform its own copy control operation based effectively on the original recording control information.

While the recording control information above is expected to be extended in detail so as to implement more sophisticated copy control from now on, the detailed information is readily converted to what is interpretable by the external unit so that the latter will carry out its copy control operation on the content data of interest in a manner effectively reflecting the extended recording control information.

As many apparently different embodiments of this invention may be made without departing from the spirit and scope thereof, it is to be understood that the invention is not limited to the specific embodiments thereof except as defined in the appended claims.

What is claimed is:

1. A data converting apparatus which inputs packet data made of content data supplemented with recording control information to be referenced upon recording of said content data and which outputs the input packet data to another apparatus, said data converting apparatus including:

inputting means for inputting said packet data;

separating means for separating said content data and said recording control information from said packet data input by said inputting means;

determining means for determining whether the separated recording control information constitutes a value matching any one of values in a first value group;

replacing means for replacing said recording control information with any one value from said first value group depending on the value constituted by said separated recording control information;

generating means for generating said packet data by supplementing said content data with said recording control information to be referenced upon recording of said content data;

outputting means for outputting said packet data to the other apparatus; and controlling means which, if said determining means determines that said recording control information separated by said separating means constitutes a second value different from any one of the values in said first value group, then causes said generating means to supplement said content data separated by said separating means with that one of the values in said first value group which is used by said replacing means to replace said second value constituted by said recording control information, said controlling means further causing said outputting means to output said packet data generated by said generating means.

2. A data converting apparatus according to claim 1, wherein, if said determining means determines that said separated recording control information matches one of the values in said first value group, then said controlling means causes said outputting means to output to the other apparatus a same packet data input by the inputting means.

3. A data converting apparatus according to claim 2, wherein said controlling means causes said generating means to generate the same input packet data by supplementing the separated content data with said separated recording control information.

4. A data converting apparatus according to claim 1, wherein said recording control information includes data for restricting copy of said content data.

5. A data converting apparatus according to claim 4, further comprising clocking means for managing time; wherein said replacing means permits copy of said content data based on a copy inhibit period included in said recording control information and on current time information furnished by said clocking means.

6. A data converting apparatus according to claim 4, further comprising receiving means for receiving a data transmission request from the other apparatus to which said packet data are output; wherein, if said receiving means receives from the other apparatus a data transmission request for content data reproduction, then said recording control information is replaced with copy inhibit data before being output to the other apparatus.

7. A data converting apparatus according to claim 4, further comprising storing means for storing the number of times each of items constituting said content data has been copied; wherein, if copy of a given content data item is requested, then said controlling means checks what is stored in said storing means and replaces said recording control information with copy inhibit data for output depending on whether the stored number of times the content data item in question has been copied exceeds a copiable count predetermined for said content data item.

8. A data converting apparatus according to claim 4, further comprising communicating means for communicating with a copyright management unit which transmits copy permission information regarding each of items constituting said content data; wherein, if copy permission information is received from said copyright management unit, then said controlling means replaces said recording control information with a copy permission for output.

9. A data converting apparatus according to claim 4, wherein said recording control information is replaced with one-generation copy permission information which allows the other apparatus having input said content data from said data converting apparatus to copy said content data to a second apparatus and which inhibits said second apparatus to copy said content data to a third apparatus.

10. A data converting apparatus according to claim 4, further comprising compressing means for compressing said content data; wherein, if uncompressed copy of said content data is inhibited, then said controlling means allows said content data after being compressed by said compressing means to be output to the other apparatus.

11. A data converting method for causing a data converting apparatus to input packet data made of content data supplemented with recording control information to be referenced upon recording of said content data and for outputting the input packet data from said data converting apparatus to another apparatus, said data converting method comprising the steps of:

inputting said packet data;

separating said content data and said recording control information from said packet data input in said inputting step;

determining whether the separated recording control information constitutes a value matching any one of values in a first value group;

replacing said recording control information with any one value from said first value group if said determining step determines that said separated recording control information constitutes a second value different from any one of the values in said first value group;

generating said packet data by supplementing the separated content data with said recording control information to be referenced upon recording of said content data; and outputting said packet data to the other apparatus.

12. A data converting method according to claim 11, wherein, if said determining step determines that said separated recording control information matches one of the values in said first value group, then said outputting step outputs to the other apparatus a same input packet data.

13. A data converting method according to claim 12, wherein said generating step generates the same input packet data by supplementing the separated content data with said separated recording control information.

14. A data converting method according to claim 11, wherein said recording control information includes data for restricting copy of said content data.

15. A data converting method according to claim 14, wherein said replacing step replaces said recording control information with copy permission information allowing said content data to be copied based on a copy inhibit period included in said recording control information and on current time information.

16. A data converting apparatus according to claim 14, wherein, if a data transmission request for content data reproduction is received from the other apparatus, then said recording control information is replaced with copy inhibit data before being output to the other apparatus.

17. A data converting method according to claim 14, wherein, if copy of a given content data item is requested, then said replacing step replaces said recording control information with copy inhibit data for output depending on whether a stored number of times the content data item in question has been copied exceeds a copiable count predetermined for said content data item.

18. A data converting method according to claim 14, wherein, if copy permission information is received from a copyright management unit, then said replacing step replaces said recording control information with a copy permission for output.

* * * * *